Figure 9:
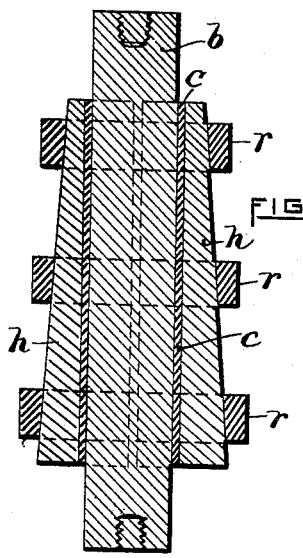

(No Model.) 3 Sheets—Sheet 1.
L. L. BURDON.
PROCESS OF MAKING COMPOUND INGOTS.
No. 432,690. Patented July 22, 1890.
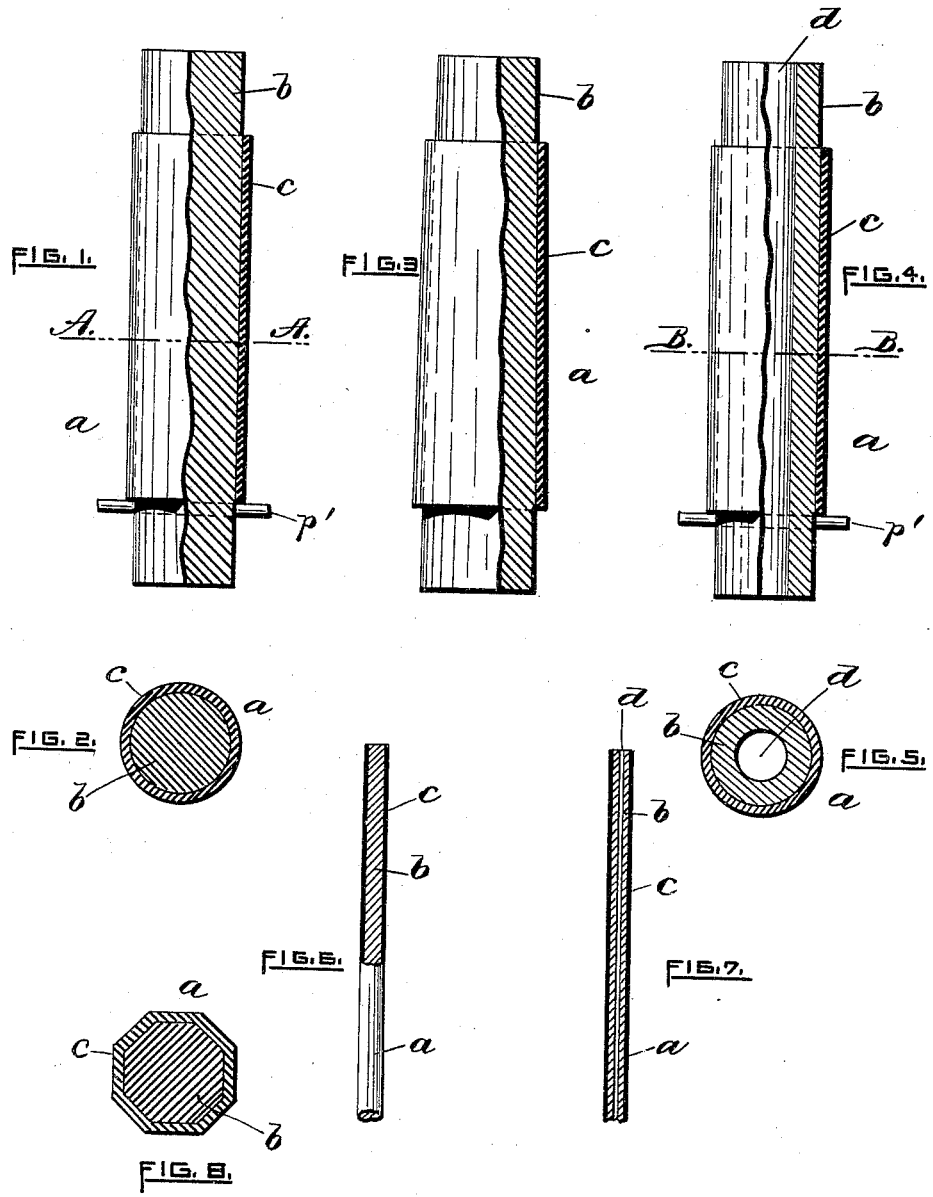
WITNESSES.
Charles Hannigan
Herbert F. Tourtellot
INVENTOR.
Levi L. Burdon
By Remington & Hawthorn
Attys.

(No Model.) 3 Sheets—Sheet 2.

L. L. BURDON.
PROCESS OF MAKING COMPOUND INGOTS.

No. 432,690. Patented July 22, 1890.

WITNESSES:
Charles Hannigan
Herbert F. Soutellot

INVENTOR:
Levi L. Burdon.
By Remington & Henshor
Attys.

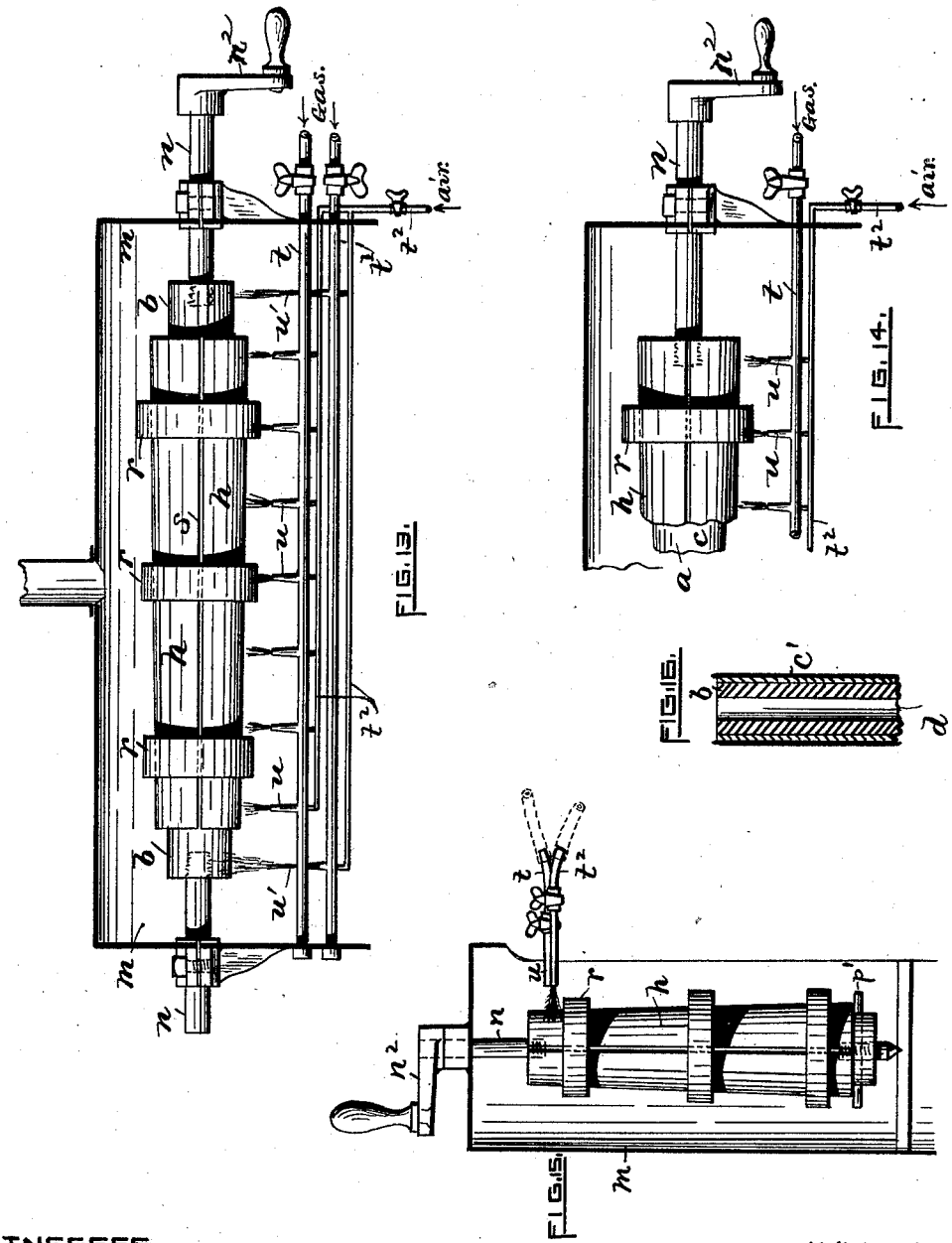

UNITED STATES PATENT OFFICE.

LEVI L. BURDON, OF PROVIDENCE, RHODE ISLAND, ASSIGNOR TO THE BURDON SEAMLESS FILLED WIRE COMPANY, OF SAME PLACE.

PROCESS OF MAKING COMPOUND INGOTS.

SPECIFICATION forming part of Letters Patent No. 432,690, dated July 22, 1890.

Application filed February 21, 1890. Serial No. 341,252. (No model.)

*To all whom it may concern:*

Be it known that I, LEVI L. BURDON, a citizen of the United States, residing at Providence, in the county of Providence and State of Rhode Island, have invented certain new and useful Improvements in the Process of Making Compound Ingots; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Heretofore in the manufacture of compound ingots, more especially such as are to be reduced to wire having a seamless exterior surface of fine metal, it has been my usual practice to unite the fine metal to the interior portion or base-metal core by solder or other easy-fusing composition, as may be ascertained by an inspection of the several United States patents granted to me during the past five or six years.

In some instances seamless compound ingots are described as being produced without the aid of solder—as, for example, a solid or hollow cylindrical base-metal core of suitable size is inserted into and closely fitting a seamless shell or tube of fine metal, as gold, the ingot then being reduced to wire by suitable mechanism. An objection to such unsoldered ingot is, that in the process of reducing it to wire the core and shell do not reduce uniformly—that is, the core will elongate to a greater degree than the shell, or vice versa—thereby preventing a sufficiently close union of the parts, so that when the wire is bent, as in making links, rings, &c., the inner metal or the shell will produce slight inequalities or undulations due to the difference in the degree of elongation of the two metals. These defects become very marked or conspicuous when the surface is polished and detract from the value of the articles produced.

Another old and well-known described method of producing compound ingots without solder is to first cast a shell or tube of fine metal, and then after cooling it to pour into and fill its chamber with a quantity of molten base metal, or vice versa, thereby fusing the parts together. Such fused ingots—that is, where molten metal is employed, as just stated—will be found to be very unequal or irregular in thickness as regards the fine metal, particularly when thin shells are employed. One reason for this is due to the fact that the surface of the shell is "pitted" to a greater or less extent as a result of the casting process. These pits or depressions form thin places in the shell, which, when the ingot is reduced to wire, become elongated and form streaks or seams, through which the base metal is exposed, and obviously the portions or wire thus affected must be cut out, thereby increasing the percentage of waste. Another reason why such former fused ingots were imperfect is that in pouring the base metal into the gold shell the degree of fusing was variable, because the hottest metal first strikes the sides of the shell at the bottom, producing, say, at that point a perfect union of the metals; but as the pouring progresses the metal is continually cooling or losing its heat, so that at the upper end of the shell or ingot, when it has a length of several inches, the two metals will not be united, or if united at all it will be very irregular; or, in other words, in pouring the base metal it penetrates the gold unequally, according to the heat retained in the metal that is poured, the result being that in the subsequent process of reducing the ingots "blisters," or places where the core and shell are not united, will appear on its surface, which must be cut out, as just stated. These defective places frequently exhibit a fracture of the outer metal, such fractures being due to the unequal elongation of the two metals where disunited. In case the fine metal or gold alloy to compose the shell be in a fluid state and the base metal rod or core be then inserted into it, the fine metal will, owing to the increased temperature required to keep it molten, melt away the softer or lower-fusing metal to such an extent as to seriously affect the desired quality or grade of fine metal—that is to say, it will produce a mixture of the lower metal with the higher, (gold,) thus reducing the quality of the gold employed and seriously affecting its carat.

This latter process will obviously produce ingots having an unequal thickness of the outer metal. At the same time, even under the most favorable conditions, where an apparently perfect union of the parts exists, such outer metal will have varying degrees of fineness throughout the length of the ingot. In such former instances, whenever attempts have been made to produce ingots for seamless wire without the use of solder, I believe in every case the result has been that the product was not free from some one or all of the defects referred to. Such products therefore are consequently valueless, even as substitutes for wire as ordinarily plated.

The object I seek to attain by my present improved process is not only to produce a compound ingot without the aid of solder or using metal in a molten state, but at the same time I aim to produce an ingot devoid of the objections before referred to.

To that end my invention consists, essentially, in placing a base-metal core, solid or annular in cross-section, into a seamless tubular shell of fine metal, the contiguous surfaces having been previously cleaned and covered with a suitable mixture or substance—as alkalies, borax, &c.—to promote the fusion of the metals, after which the parts are secured in a suitable holder and then subjected to a high degree of heat for a proper period or until the heat has caused certain of the alloys employed in the two contiguous metals to melt and fuse together, thereby welding the shell to the base-metal core. This manner of uniting metals is termed "sweating."

In the sweating process—that is, when no solder is applied—it is necessary that the gold alloy and base metal shall possess inherent qualities, such that when the metals are subjected to a suitable temperature they will become united. These qualities may be attained by an increased proportion of the easy-fusing metals which form a part of the two metals to be united. My practice has been to use for this purpose silver and zinc, which are respectively incorporated with the gold alloy and base metal, because of the apparent affinity of the silver and zinc for one another. I would state here that it may not be possible with the aid of published data to make a very approximate temperature at which the fusion and union of the two metals occur, because "the melting-points of alloys do not follow the ratios of those of their constituent metals."

For certain grades or qualities of compound wire the shell itself may be plated and sweated to the core portion—that is, the seamless tubular shell may be formed from a disk of thin rolled plate, the latter consisting of a plating-metal base having united to one of its faces a thin layer or sheet of fine metal. By thus substituting a plated seamless shell for one made wholly of alloyed gold the relative proportions of the gold and base metal of the compound wire may be practically changed as desired.

In the sweating operation I have found it desirable in some cases to first surround or incase the shell portion of the ingot with a metallic tapering shell or holder in halves and held together by a series of clamping-rings. This holder not only serves to temper or equalize the heat imparted to it, and which in turn passes to the seamless shell surrounding the core, but it also serves to preserve the true form of the shell, in that the latter cannot become distorted under the influence of the applied heat. As the ingot contracts in cooling, the rings are forced along the tapering surface of the holder, thereby insuring a uniform contraction of the shell and a consequent close union of it with the core. I have also sometimes used a layer of fibrous material, as paper, which is interposed between the adjacent surfaces of the holder and the seamless shell. An advantage due to its use is that it prevents the shell from oxidation during the sweating process, and at the same time it also forms a slightly-yielding medium, thereby preserving the shell from the corners or edges of the holder.

Figure 10:
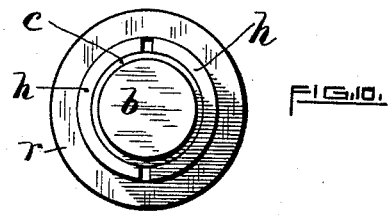
Figure 11:
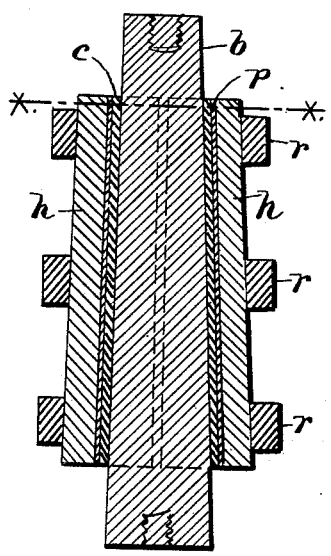
Figure 12:
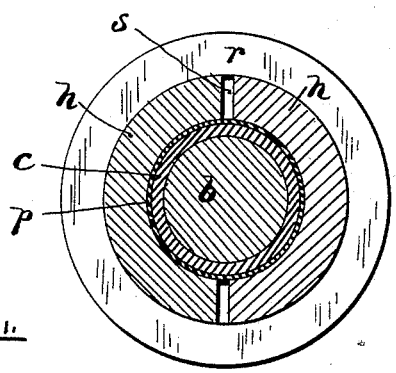

In the accompanying sheets of drawings, Figure 1, Sheet 1, represents a side elevation (in partial section) of my improved ingot as produced by my improved method or process—that is, a cylindrical-shaped ingot having a seamless outer shell of fine metal united by sweating to the inner portion or core, the metal of which has a lower value than that of the exterior portion or shell. Fig. 2 is a cross-sectional view taken on line A A of Fig. 1. Fig. 3 is a view similar to Fig. 1, the ingot being slightly larger at one end than the other, or tapering. Fig. 4 is a side elevation, also in partial section, of my improved ingot, having a hollow core. Fig. 5 is a transverse sectional view of the same, taken on line B B. Fig. 6 represents a piece of seamless wire reduced from the ingots shown in Figs. 1 and 3. Fig. 7 is a similar piece of wire reduced from the ingot shown in Fig. 4. Fig. 8 is a transverse sectional view of my improved seamless ingot having a polygonal form. Fig. 9, Sheet 2, shows, in central longitudinal section view, a manner of preparing the core and shell in order to effect the sweating of these parts. Fig. 10 is an end view. Fig. 11 is a sectional view similar to Fig. 9, representing a tapering ingot arranged to be placed in a suitable furnace and be sweated. Fig. 12 is a transverse sectional view enlarged, taken on line $x$ $x$ of Fig. 11. Fig. 13, Sheet 3, represents an ingot mounted in a furnace adapted to effect the union of the core and shell by sweating. Figs. 14 and 15 represent modifications of the manner of applying heat to the ingot; and Fig. 16 represents a portion of an ingot or wire enlarged, having sweated to the core portion a plated seamless shell.

$a$, referring to the drawings, indicates my improved ingot or compound wire having a seamless exterior shell sweated to the core portion, substantially as described and claimed in my application for patent, Serial No. 321,861, now pending in the United States Patent Office. The shell c, which is seamless, may be drawn up from a disk of suitably-alloyed fine metal. The walls of the shell may be of any desired thickness, according to the grade of product required—that is, the wire may be, say, "one-quarter plate," one-eighth, one-tenth, one-twentieth, &c., or even one-fortieth. In the lower grades, however, I prefer to draw up the shell c', Fig. 16, from a disk of stock-plate—that is, a base of plating metal having united to one of its surfaces a thin layer of suitably-alloyed gold.

The base-metal or core portion b of the ingot or wire may be solid, annular, as shown in Figs. 4 and 5, wherein a central hole d extends throughout the length of the piece, or it may be polygonal or any other suitable form cross-sectionally. The core b is made of a composition of "plating metal," zinc forming one of the metals composing it, the fine-metal or gold shell c being alloyed, say, with silver. These two metals, zinc and silver, seem to have an affinity for one another. After the shell and core have been made to the desired length the two surfaces which are to be united are next thoroughly cleaned and covered with borax to promote the fusion of the metals. In some cases I make the core of greater length than the shell, the former just fitting the shell and extending from each end a short distance, as shown. After the core is inserted into the shell I next preferably place the ingot in one half of a holder or clamp h, having a conical or tapering form externally, then place the other half of the holder on the ingot, followed by placing a series of rings r, Figs. 9 and 10, over the holder and driving them down firmly, thus wedging the holder snugly against the shell. I next secure an arbor or shaft, as n, to the ends of the ingot, and place the whole within a furnace adapted for its reception. Fig. 13 shows how a furnace m may be arranged for the purpose. In this case the ingot lies horizontally in bearings, and by means of a crank $n^2$ it may be revolved. The heating may be effected by a series of flame-jets arranged to produce an intense heat similar to the well-known principle of the "Bunsen burner," or in any other suitable manner, the gas and air passing to the burners u by means of the supply-pipes $t\,t^2$, respectively. The flame from these burners bears directly upon the holder h, while at the same time another series of burners u', supplied from another series of pipes $t'\,t^3$, may impart an increased temperature to the projecting ends of the core b, the crank being slowly revolved during the operation. Now when the proper degree of heat is attained it will by its action, and also through the medium of the borax, melt the easy-fusing metals of the core and shell. The fused metals readily seek one another and unite or amalgamate, thus completing the sweating operation, the heat at the proper instant being withdrawn. I would state that the presence of the holder h serves to temper the heat before its (the heat's) action upon the shell; but by reason of the end burners u' and the extension of the core the latter serves to conduct a greater amount of the heat to the interior of the core. In some cases the core may be made hollow, as shown in Figs. 4 and 5, and the flame inserted therein to assist or facilitate the heating of the ingot. In Fig. 14 the projecting end of the core is omitted, the entire heating being effected by one series of burners. In Fig. 15 is represented a compound burner connected by flexible tubes to the supply of gas and air. In this case the ingot is also revolved; but the workman is compelled to continually change the direction of the flame along the ingot, so as to heat it uniformly. In case the ingot is placed at an angle or vertically within the furnace I provide a stop at the lower end, as at p', Figs. 1 and 4, to prevent the shell from dropping off. This is not essential in the event of making the ingot tapering, as shown in Figs. 3 and 11, or even when placed horizontally within the furnace. After the fusion has been effected and the cooling and consequent contraction begin I insure the contact of the shell and core by driving the rings r along the holder to clamp it more firmly to the shell. When the parts are sufficiently cooled, the rings are knocked off and the holder removed. By this interposition of a layer of paper p or other suitable fibrous substance placed between the adjacent surfaces of the holder h and seamless shell c (see Figs. 11 and 12) the fine metal or gold is found to be free from oxidation during the heating operation. At the same time the paper also serves to prevent the holder from defacing the shell. In this manner of uniting metals the heat by conduction gradually raises the temperature of the core lying within the shell until a point is reached equal to the fusing-point of the zinc or other low-fusing metal forming a part of the core, the heat upon the exterior of the shell, at the same time transforming the low-fusing metal, as silver, with which the gold shell is alloyed, into a semi-solid state, and by means of the flux (borax) readily unites or commingles with the zinc of the core. At the same time, as the base-metal core b expands more relatively than the gold or fine-metal shell c, it follows that the contiguous surfaces are brought into closest contact thereby. In order to prevent the shell from dropping from the core, as possibly it might do before the core is sufficiently heated, I sometimes form a stop by inserting a pin p' transversely into the lower portion of the core, as before stated and as shown in the drawings. By means of uniting the shell and core, as above described, it is obvious that the union is effected entirely without the employment of solder. The workman must, however, possess considerable skill and experience to successfully "sweat" the surfaces together, so that when the ingot is reduced to wire it shall be free from blisters—*i. e.*, portions of the gold surface—which are disconnected from the core by reason of the non-fusing of the alloys. After the shell is sweated to the core the ingot can be reduced to wire by first repeatedly passing it through a suitable swaging-press until it is reduced in size to enter a "draw-plate," which latter finally reduces it to the desired size, the stock meanwhile being frequently annealed, as usual in the process of wire-drawing. From experiments which I have made in producing compound wire from my sweated ingot *a*, I have found that the fine metal is firmly welded to the core, the two parts retaining the same relative proportions they possessed in the ingot.

I claim as my invention—

1. A compound ingot composed or consisting of an inner portion of inferior metal united by sweating to an exterior seamless shell of metal of greater value, the adjacent surfaces of the said inner portion and shell being first suitably prepared and covered with a mixture of borax to promote a fusion of the metals, next inserting the inferior metal within the seamless shell, then placing and mounting the whole within a suitable holder, then subjecting the parts to the action of heat for a proper length of time until certain of the alloys employed in the two contiguous metals of the ingot melt and fuse together, thereby welding or sweating the seamless shell to the inner or inferior metal, and finally reducing the ingot to wire.

2. The improvement in the manufacture of compound ingots adapted to be reduced to seamless plated wire, the same consisting in preparing and covering with borax or similar substance the inner surface of a seamless alloyed gold or plated shell, then inserting a similarly-covered piece of inferior metal or core within the seamless shell, next placing and suitably mounting the parts within a furnace, and finally subjecting them to a high degree of heat for a proper period, or until the heat has caused certain of the low-fusing alloys employed in the said two contiguous parts to melt and fuse together, thereby sweating the seamless shell to the core, substantially as hereinbefore set forth.

3. The improvement, substantially as hereinbefore described, in the manufacture of compound ingots, the same consisting in inserting a boraxed core of suitably-alloyed metal within a similarly-prepared seamless shell of alloyed metal of relatively greater value than the core, then placing the whole within a holder and clamping the parts firmly together, next mounting them in a suitable furnace and subjecting the parts to a high degree of heat for a proper period, or until the action of the heat has caused certain of the alloys employed in the core and shell to melt and fuse together, thereby forming a union of the parts by sweating, and finally compressing the holder around the ingot as the latter contracts in cooling.

4. The improvement, substantially as hereinbefore described, in the manufacture of compound ingots, the same consisting in inserting a boraxed core of suitably-alloyed metal within a similarly-prepared seamless shell of alloyed metal of relatively greater value than the core, then covering the ingot with fibrous material—as, for example, paper—to prevent oxidation, &c., then placing the whole within a holder and clamping the parts firmly together, next mounting them in a suitable furnace and subjecting the parts to a high degree of heat for a proper period, or until the action of the heat has caused certain of the alloys employed in the core and shell to melt and fuse together, thereby forming a union of the parts by sweating, and finally compressing the holder around the ingot as the latter contracts in cooling.

5. The improvement in the manufacture of compound ingots, consisting of a seamless exterior shell and an inner portion or core of metal of less value than said shell, each possessing inherent qualities or easy-fusing alloys such that when the prepared ingot is subjected to a suitable temperature the said easy-fusing alloys, which form a part of the two metals to be united, melt and fuse together, thereby sweating or welding the shell to the core, and adapted to be reduced to seamless plated wire.

In testimony whereof I have affixed my signature in presence of two witnesses.

LEVI L. BURDON.

Witnesses:
CHARLES HANNIGAN,
GEO. H. REMINGTON.